US005714903A

United States Patent [19]

Bruccoleri et al.

[11] Patent Number: 5,714,903

[45] Date of Patent: Feb. 3, 1998

[54] LOW CONSUMPTION ANALOG MULTIPLIER

[75] Inventors: Melchiorre Bruccoleri, Genoa; Gaetano Cosentino, Catania; Marco Demicheli, Binago; Salvatore Portaluri, Pavia, all of Italy

[73] Assignees: SGS-Thompson Microelectronics S.r.L., Agrate Brianza; Consorzio per la Ricerca sulla Microelettronica nel Mezzogiorno, Catania, both of Italy

[21] Appl. No.: 575,872

[22] Filed: Dec. 21, 1995

[30] Foreign Application Priority Data

Dec. 27, 1994 [EP] European Pat. Off. .............. 94830590

[51] Int. Cl.[6] .................................................. G06F 7/44

[52] U.S. Cl. ......................... 327/359; 327/362; 327/563; 330/257; 330/261

[58] Field of Search ..................................... 327/355, 356, 327/357, 359, 362, 563; 330/252, 254, 257, 261, 288

[56] References Cited

U.S. PATENT DOCUMENTS

| | | | |
|---|---|---|---|
| 3,793,480 | 2/1974 | Waehner | 327/346 |
| 4,156,283 | 5/1979 | Gilbert | 327/359 |
| 4,563,670 | 1/1986 | Stallkamp et al. | 341/119 |
| 5,030,924 | 7/1991 | Fritz | 330/256 |

FOREIGN PATENT DOCUMENTS

A-0 157 520 10/1985 European Pat. Off. .

OTHER PUBLICATIONS

IEEE Journal of Solid-State Circuits, vol. sc-19, No. 6, Dec. 1974 New York, US, pp. 364-373, Berrie Gilbert. "A High-Performance Monolithic Multiplier Using Active Feedback".

Gray, et al., "Analysis and Design Of Analog Interated Circuits", 1984, John Wiley & Sons, New York, US pp. 590-600.

*Primary Examiner*—Timothy P. Callahan
*Assistant Examiner*—Kenneth B. Wells
*Attorney, Agent, or Firm*—Wolf, Greenfield & Sacks, PC; James H. Morris

[57] ABSTRACT

An analog multiplier includes at least a differential output stage formed by a pair of emitter-coupled bipolar transistors. Each transistor of the pair of emitter-coupled bipolar transistors is driven by a predistortion stage having a reciprocal of a hyperbolic tangent transfer function that is attributable to the base currents of the bipolar transistors used in the predistortion stage. The error in the output signal produced by the analog multiplier is compensated by generating replicas of the base currents of the bipolar transistors of the differential output stage and forcing those replica currents on the output node of a respective predistortion stage. Various embodiments that consume different amounts of power are described.

9 Claims, 7 Drawing Sheets

LOW CONSUMPTION ANALOG MULTIPLIER

BACKGROUND OF THE INVENTION

1. Field of the Invention

The present invention relates to an improved precision analog multiplier wherein the improved precision characteristics are obtained with a minimal increase in the current consumed by the multiplier.

2. Discussion of the Related Art

In analog signal processing a circuit able to generate an output signal proportional to the product of two analog input signals is often needed. These circuits are commonly termed analog multipliers. Analog multipliers are used as balanced modulators and also in phase detectors and similar systems. In digital signal converters with a quadratic-type transfer function, the use of an analog multiplier for producing a signal proportional to the product of two identical analog signals, that is to the second power of a certain input signal, is of significant interest.

A large number of analog multipliers are based on the exponential transfer function of bipolar junction transistors (BJTs). An effectively emitter-coupled stage may represent an elementary multiplying cell, capable of generating (differential) output collector currents that depend from a differential input voltage applied to the bases of the pair of transistors that form the differential stage. By duplicating an elementary cell, it is possible to implement analog multipliers capable of functioning across two and up to all four quadrants of a differential input voltage plane. A typical four-quadrant multiplying cell is known in literature by the name of a Gilbert cell or circuit.

The maximum input voltage swing (dynamics) characteristic is of paramount importance in a multiplier. Often the input stage is emitter degenerated in order to increase the linear range. Another expedient that is widely used for reducing the error introduced by nonlinearities of the circuit consists of having a predistorting stage functionally connected upstream of the analog multiplier for introducing a "predistortion" of the input signals so as to compensate for the hyperbolic tangent transfer characteristic of the multiplying cell. The predistortion stage is commonly realized with a diode-configured bipolar transistor through which an input current signal is forced so as to produce a certain output voltage signal with a reciprocal of a hyperbolic tangent transfer function.

An elementary circuit diagram of a single ended analog multiplier, for a single quadrant, provided with an input predistortion stage, is shown in FIG. 1. The multiplying cell comprises the emitter-coupled transistors Q3 and Q4, while the predistortion stage is formed by the diode-configured transistors Q1 and Q2. The input current signals are respectively indicated as I1, I2 and IM–I1, where IM represents a preset maximum input current limit value set during the designing of the multiplier, that the dynamic range of the multiplier is capable of operating with. In practice, I1, and I2 are greater than or equal to 0 and less than or equal to IM, with the maximum value of I1 and I2 equaling IM.

Analog multipliers of this type are well known and described in literature. For example, the volume entitled: "Analog integrated circuits—Analysis and Design"; by Paul R. Grey and Robert G. Meyer; McGraw-Hill; contains a detailed description and analysis of these circuits in Chapter 10, pages 694–705 et seq..

The fundamental characteristics that an analog multiplier should possess are high precision, relatively small current consumption, and reduced circuit complexity. However, achieving any one of these characteristics often implies a compromise that adversely affects one or the others of these ideal characteristics.

Taking into consideration a circuit like the one shown in FIG. 1, and by considering the transistors Q1, Q2, Q3 and Q4 to be ideally identical and having a very large current gain ($\beta$>>100) and also, for simplicity of analysis, I2=I1=I, the circuit would theoretically provide an output signal given by: $I_{out}=I^2/IM$.

By considering the effect of a finite current gain of the single transistors that are integrated with modem fabrication processes, it is necessary to modify the above-indicated relationship as follows:

$$I_{out}=\alpha_F\frac{I^2}{IM}\quad\text{with}\ \alpha_F=\frac{\beta_F}{1+\beta_F}$$

When approaching the condition where I1 is almost equal to IM, there will be a complete unbalancing of the differential stage formed by the transistors Q3 and Q4, thus obtaining an output signal given by $I_{out}=\alpha_F IM$. In such a strongly unbalanced condition, the circuit is in its most critical operating condition because it presents a significant error in terms of absolute value as compared to the theoretical value of the output signal (i.e. an accentuated nonlinearity).

It has been observed that an important aspect of this type of circuit, which may be responsible for the above noted imprecision, is the effect of the base current of transistors Q3 and Q4 of the multiplying cell (which is intrinsically nonnegligeable) on the predistortion stage, constituted by the diode-configured transistors Q1 and Q2. These base currents have the effect of hindering a full unbalancing of the differential stage, thus contributing to significantly increase the error on the output signal.

In the case of integrated circuits, it should be noted moreover, that the precision of the multiplier circuit of FIG. 1 is further reduced because the above-noted conditions leading to errors, markedly depend, in turn, on process spread, temperature variations and supply voltage variations.

SUMMARY OF THE INVENTION

It is an object of the present invention to provide a remedy to the above-noted problems of imprecision in an analog multiplying circuit like the one shown in FIG. 1. It is also an object of the present invention to remedy the above noted problems of imprecision in analog multipliers similar to that of FIG. 1, that are designed for one or more quadrants, and employ predistorting stages of the analog input signals having a transfer function of the reciprocal of a hyperbolic tangent type.

A further objective of the present invention is to provide a system for correcting or compensating the error deriving from a non-negligible base current of the bipolar transistors that compose the multiplying cell or cells, and which can be realized with a limited or null increase in the current consumption by the circuit.

According to a first embodiment of the present invention, the error due to nonlinearities in a multiplier is strongly reduced by compensating for the effects of the base currents of the bipolar junction transistors of the multiplying cell on the diode-configured transistors of the respective predistortion stage. This is obtained by generating through an equal number of dummy transistors, substantially identical to those of the basic circuit, and through which a current substantially identical to the respective input current signals is forced, base currents corresponding to the actual state of conduction of the transistors of the basic circuit. The base currents so generated are mirrored on the respective emitter nodes of the diode-configured transistors of the relevant predistorting stage for compensating the base currents of the transistors of the multiplying cell.

Moreover, a compensation for the base currents of the pair of transistors that compose the multiplying cell also on the output nodes (collectors) of the multiplying cell, may be implemented by subtracting (pulling) a base current directly from the collector nodes of the pair of transistors of the differential stage by the use of a current mirror. Also in this case, a pair of transistors identical to the transistors that compose the differential stage and having their bases connected to the collectors of the transistors of the differential stage, respectively, may be used. Through these additional (dummy) compensation transistors a current substantially identical to the respective input current signal is forced.

According to this first embodiment of the invention, a compensation of the effects of the base currents of the transistors of the multiplying cell of the functional circuit is achieved and this significantly reduces the error, as will be shown later. This important result is obtained with a penalty that is represented by an increased current consumption due to the "doubling" of the current paths, as compared with the basic (uncompensated) circuit.

According to an alternative embodiment of the invention, a compensation based on generating replicas of the base currents is implemented exclusively in the predistortion stage, while the compensation in the differential stage of the multiplying cell itself is implemented by mirroring a current given by the ratio between the set maximum input current value and the current gain of the transistors (IM/β) on the common emitter node of the differential pair of transistors. According to this second embodiment of the invention, a marked reduction of the error is achieved with a greatly diminished increase in the current consumption.

According to a further aspect of the invention, it is possible to obtain a reduction of the error due to the effects of the base currents of the transistors of the basic multiplying circuit, of an amount which is comparable to the reduction of the error obtained with the above-described embodiments, by the use of a compensating circuit functioning in a fixed mode without increasing the current absorption of the circuit.

Under certain operating conditions of the analog multiplier, configurable during the design stage, for example for identical input current signals (for implementing a quadratic function) or more generally for input current signals of substantially the same order of magnitude, the compensation of the error according to this latter embodiment of the invention is very effective and can be obtained without affecting the current consumption and with a negligible increase in the circuit complexity.

BRIEF DESCRIPTION OF THE DRAWINGS

Preferred, non-limiting embodiments of the present invention will be described by way of example with reference to the accompanying drawings, in which.

DETAILED DESCRIPTION

Figure 1:
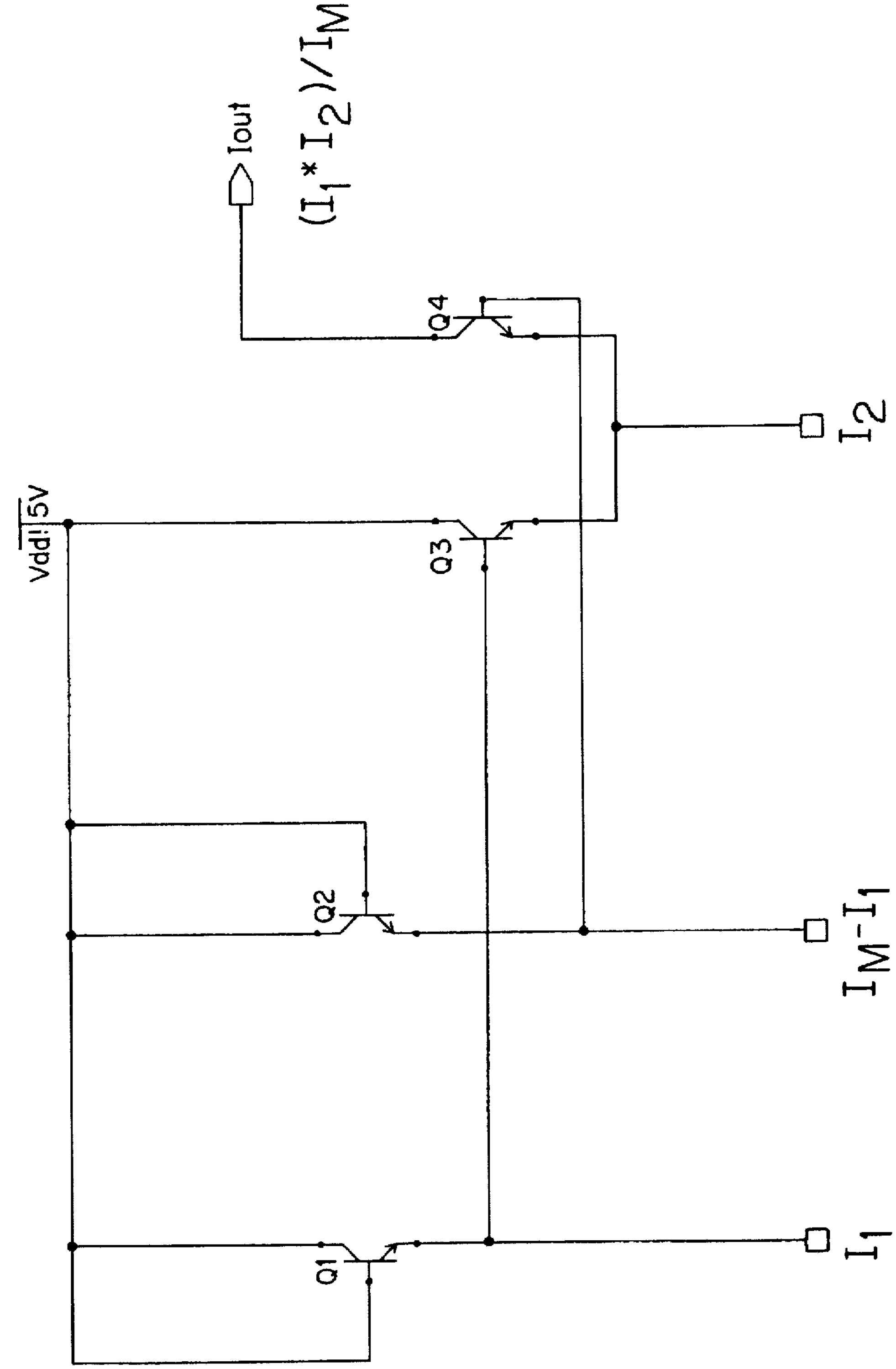
FIG. 1 (PRIOR ART)
FIG. 1 is a diagram of a multiplying cell preceded by a predistortion stage.
Figure 2:
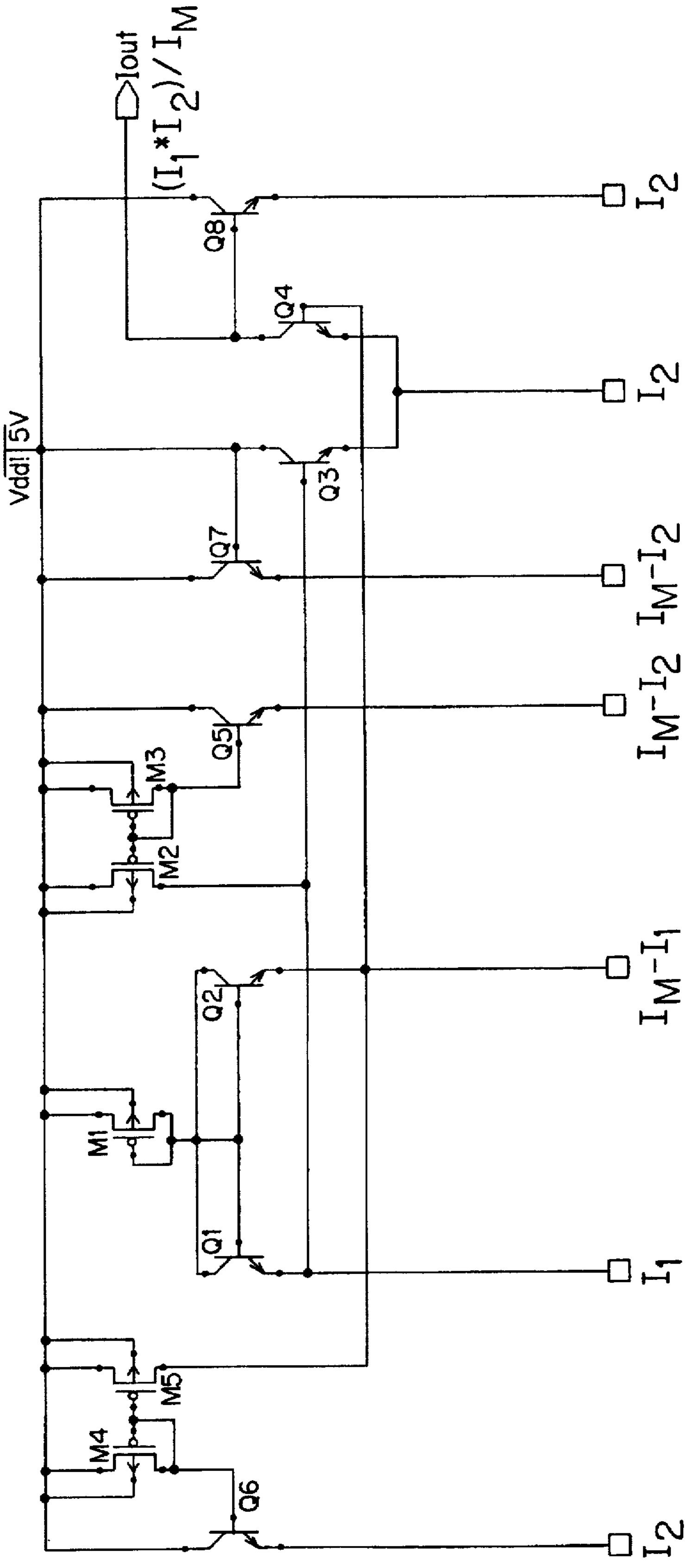
FIG. 2 is a diagram of a circuit functionally similar to the circuit of FIG. 1, made according to a first embodiment of the present invention.

A first compensation scheme for the error introduced by the base currents of bipolar transistors that form a basic multiplying cell as the one shown in FIG. 1, is depicted in FIG. 2. According to this embodiment of the invention, four additional (dummy) bipolar transistors Q6, Q5, Q7 and Q8 having electrical characteristics substantially identical to those of the transistors that form the basic circuit Q1, Q2, Q3 and Q4 are employed.

The input current signals are forced also through these additional transistors, respectively, and precisely: I2 through Q6, IM–I2 through Q5, IM–I2 through Q7 and I2 through Q8. The base current of the transistor Q5 is mirrored by the current mirror circuit formed by the MOS transistors M2 and M3 on the emitter of the predistorting transistor Q1, through which the input current signal I1 is forced. Because the input current signal IM–I2 forced through transistor Q5 is substantially identical to the input current signal forced through transistor Q3, and because transistors Q5 and Q3 are substantially identical, the base current of transistor Q5 replicates the base current of Q3. Thus, a replica of the base current of transistor Q3 is mirrored by transistors M2 and M3 on the emitter of the predistorting transistor Q1. The base current of the transistor Q6 is similarly mirrored by the mirror M4–M5 on the emitter of the predistorting transistor Q2, through which is forced the input current signal IM–I1. Because the input current signal I2 forced through transistor Q6 is substantially identical to the input current signal forced through transistor Q4, and because transistors Q6 and Q4 are substantially identical, the base current of transistor Q6 replicates the base current of Q4. Thus, a replica of the base current of transistor Q6 is mirrored by transistors M4 and M5 on the emitter of the predistorting transistor Q2.

Compensation for the base current of the transistors Q3 and Q4 in the multiplying stage (output differential stage) is implemented by subtracting directly the base current of the transistor Q7 from the collector node of Q3 and the base current of the transistor Q8 from the collector node of the transistor Q4. The "diode" M1 connected between the predistortion stage and the supply rail has the function of maintaining the transistor Q3 and Q4 always in a linear zone of their operating characteristic. It may be shown that the effects of the base currents of the transistors Q1, Q2, Q3 and Q4 are effectively compensated for the entire dynamic input range of the multiplier.

This solution, though being extremely effective in compensating for the error on the output current generated by the circuit through the entire useful dynamic range, has the disadvantage of increasing the current consumption. As it may be observed, the current paths are essentially doubled, thus practically implying a doubling of the current consumption.

Figure 3:
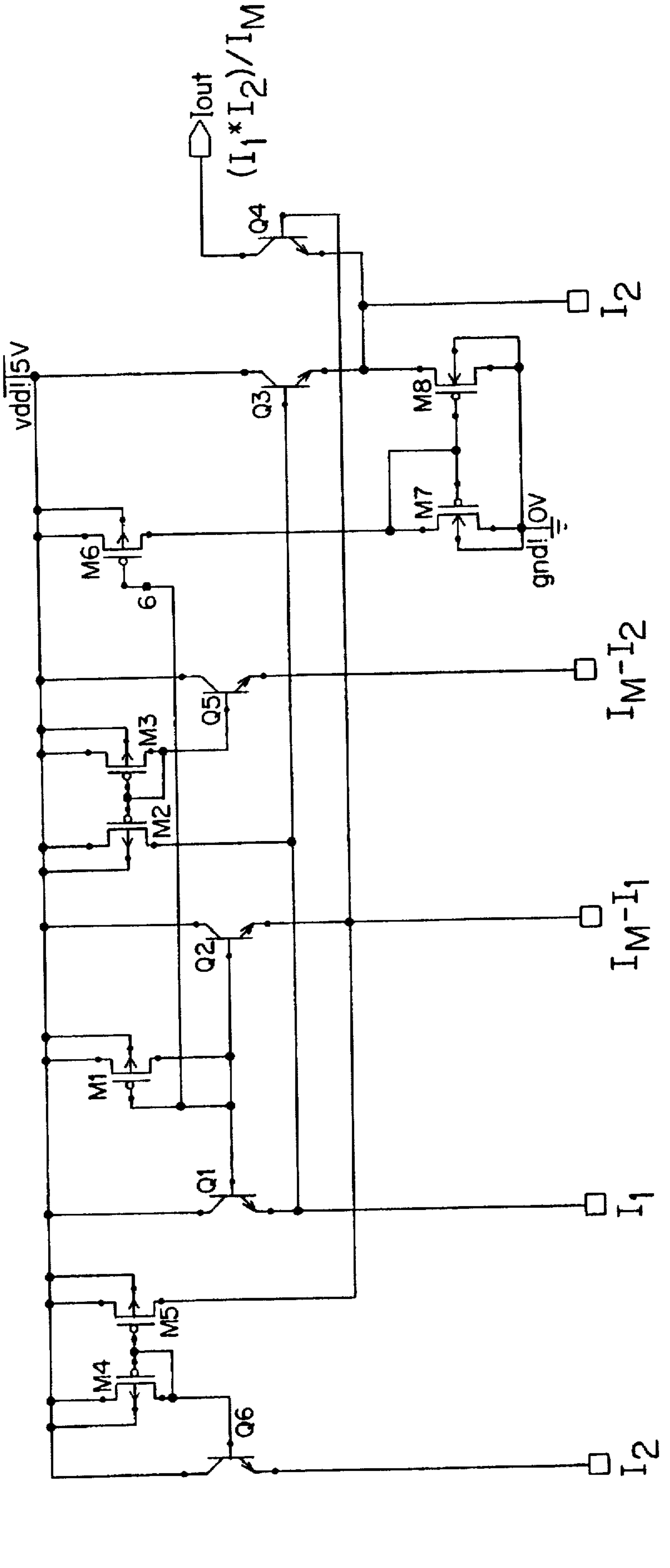
FIG. 3 shows an alternative embodiment of the circuit of the invention.

An alternative embodiment of the invention with comparable effectiveness in terms of error compensation, but with a lesser increase in current consumption for a single-quadrant, single ended multiplier similar to the one depicted in FIG. 2, is shown in FIG. 3.

According to this alternative embodiment, compensation for the effect of the base currents on the predistortion stage, using additional (dummy) transistors Q5 and Q6 and the current mirrors M2–M3 and M4–M5, is implemented in a way similar to the case of the embodiment of FIG. 2. However, compensation for the base current of the transistors Q3 and Q4 in the multiplying stage (output differential stage) is implemented by mirroring a certain current that is inversely proportional to the current gain β of the transistors and which may be set to be precisely equal to the reciprocal of the current gain (1/β), and the .maximum preset input current (IM).

This is achieved by mirroring the base currents of transistors Q1 and Q2 of the predistortion stage on the common emitter node of the output differential pair Q3 and Q4, through the pair of complementary current mirrors formed by the MOS transistors M1, M6 and M7, M8. As may be observed, according to the embodiment of FIG. 3, the penalty in terms of increased current consumption is markedly reduced in comparison with the first embodiment of FIG. 2, because only two additional current paths (through Q5 and Q6) are required.

Figure 4:
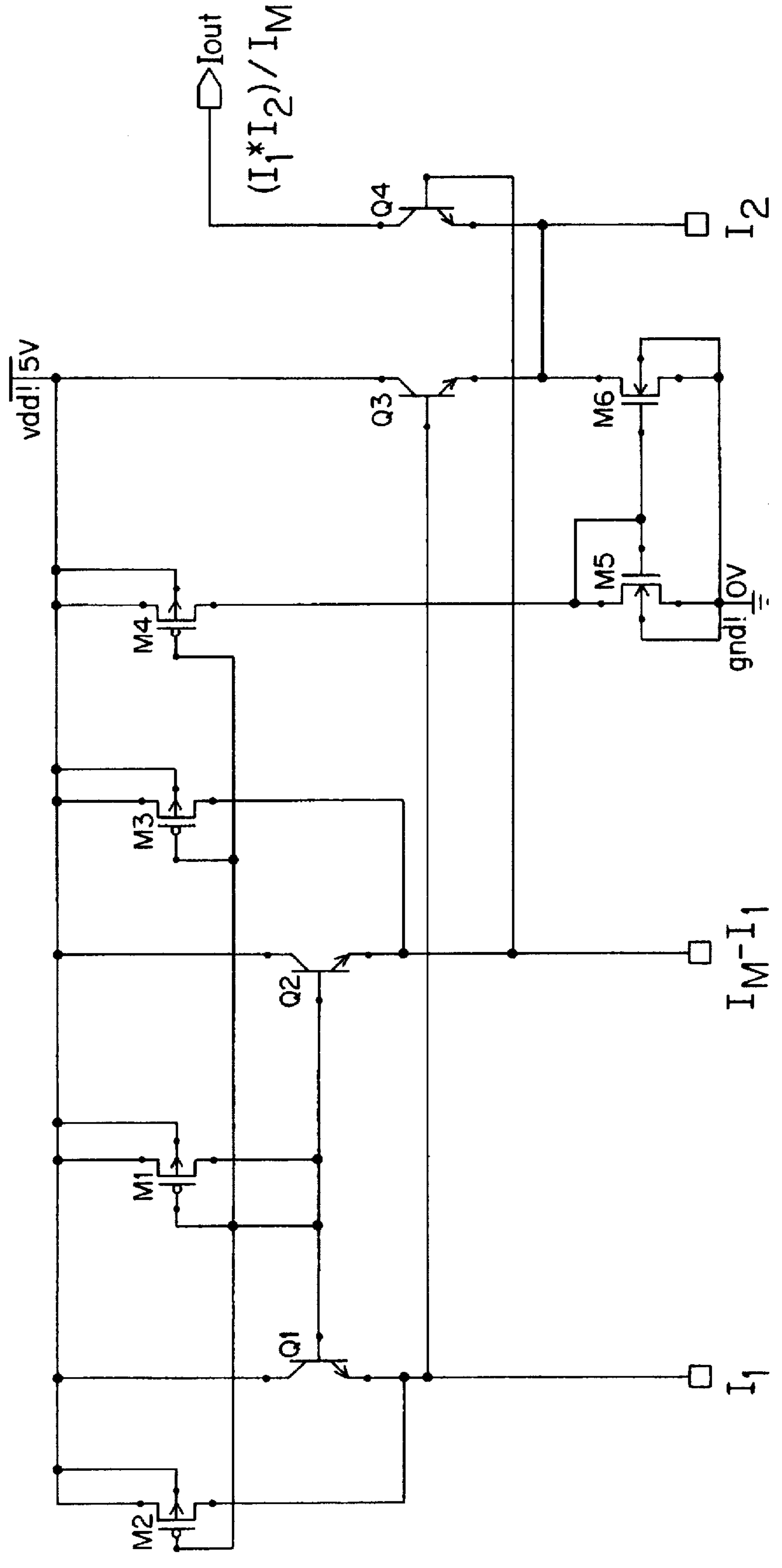
FIG. 4 shows a further alternative embodiment of the circuit of the invention.

A third and generally preferred embodiment of the invention, particularly for applications that place a premium on minimal current consumption, is depicted in FIG. 4, always with reference to the diagram of a one-quadrant, single-ended analog multiplier circuit functionally equivalent to the one shown in FIG. 1.

This embodiment does not contemplate the realization of any additional forced current path and therefore implies a negligible increase in the current consumption. Compensation for the effects of the base currents of the transistors Q3 and Q4 of the multiplying cell is implemented by the use of the MOS transistors M1, M2, M3 and M4, capable of mirroring the same current, equivalent to IM/β, on the emitter of each of transistors Q1 and Q2 of the predistortion stage as well as on the common emitter node of the pair of transistors Q3 and Q4 of the multiplying cell (output differential stage).

Figure 5:
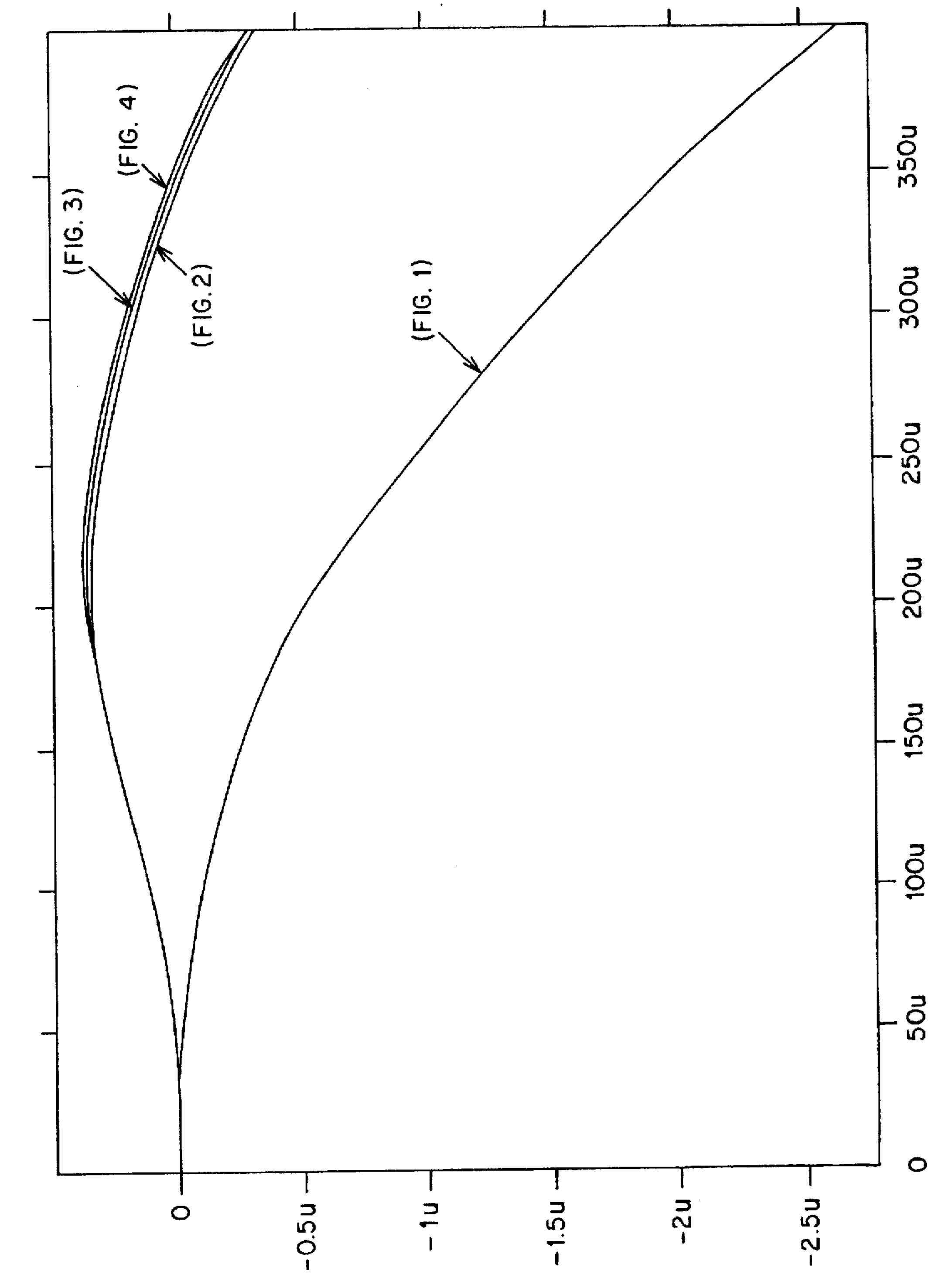
FIG. 5 shows comparable response curves obtained by simulation for the circuits of FIGS. 1–4.

Response curves, obtained by simulation, are shown in FIG. 5 and demonstrate the effectiveness of the compensation schemes of the invention as compared with the response curve of a basic circuit, without compensation. The different labeled curves refer to the sample circuits shown in the respective figures, and report in abscissa the value of the input current signals considering the particular case where I1=I2=I, while the resulting error expressed in μA may be read on the ordinate.

As may be observed, the different compensation schemes of the invention corresponding to the above described different embodiments which vary in terms of current consumption, produce a marked compensation of error, which in the case of a base circuit without any compensation device of the invention, is indicated by the curve corresponding to the circuit of FIG. 1. Surprisingly, the compensation scheme of the embodiment shown in FIG. 4 also produces a marked reduction of the error that is comparable to that obtained using the alternative circuits of FIGS. 3 and 2, which consume increasing amounts of current.

Although the invention has been described for the case of a one-quadrant multiplier, it may be effectively used also in the case of multipliers functioning in more than one quadrant.

Figure 6:
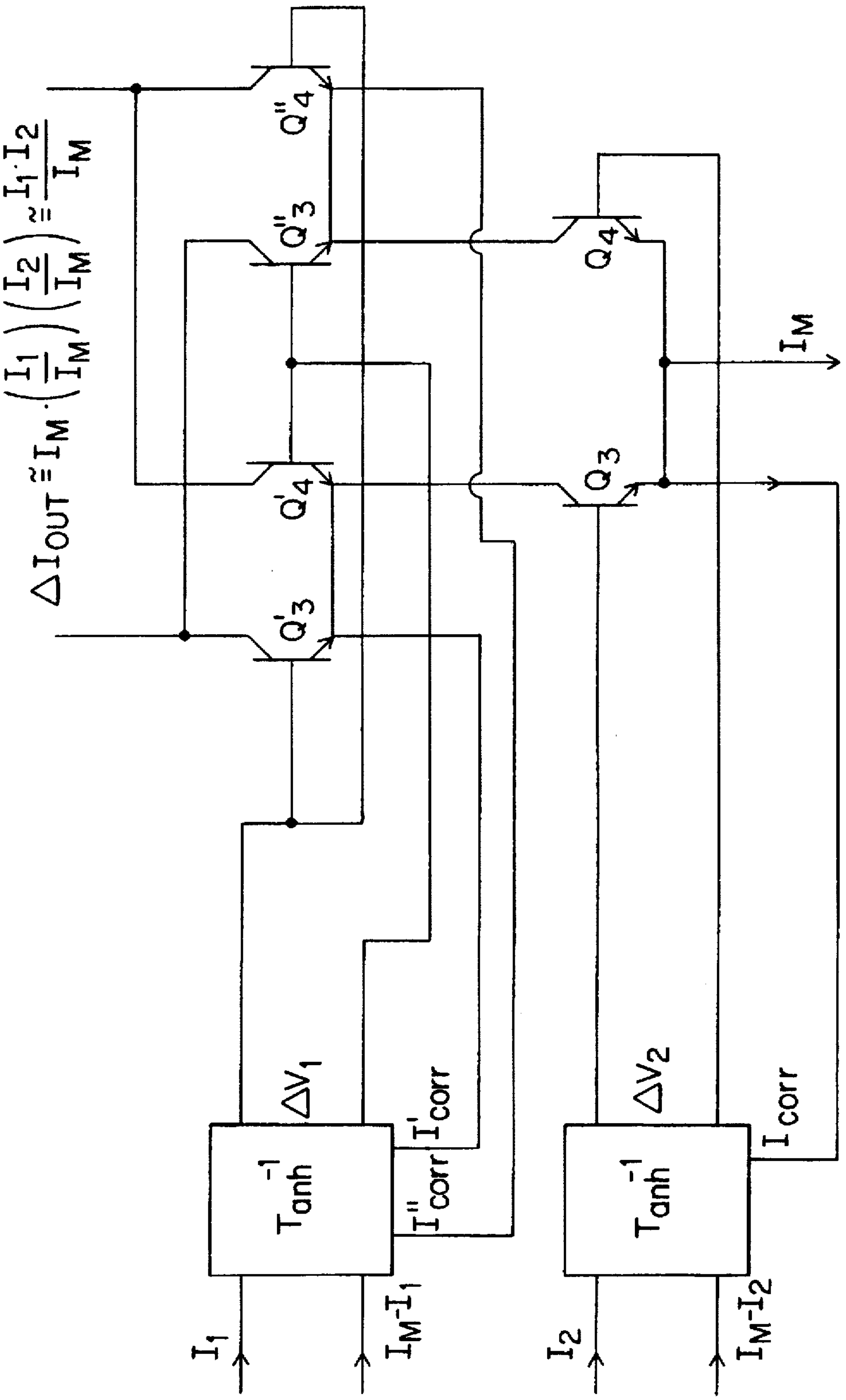
FIG. 6 is a block diagram of a four-quadrant multiplier incorporating an error compensation circuit of the invention.

A four-quadrant multiplying cell (Gilbert cell) is depicted in FIG. 6. It essentially comprises three pairs of emitter-coupled transistors: Q3–Q4, Q3'–Q4' and Q3"–Q4". Naturally, the circuit may be configured for a differential output (as shown in the scheme of FIG. 6) or also for a single-ended output.

Figure 7:
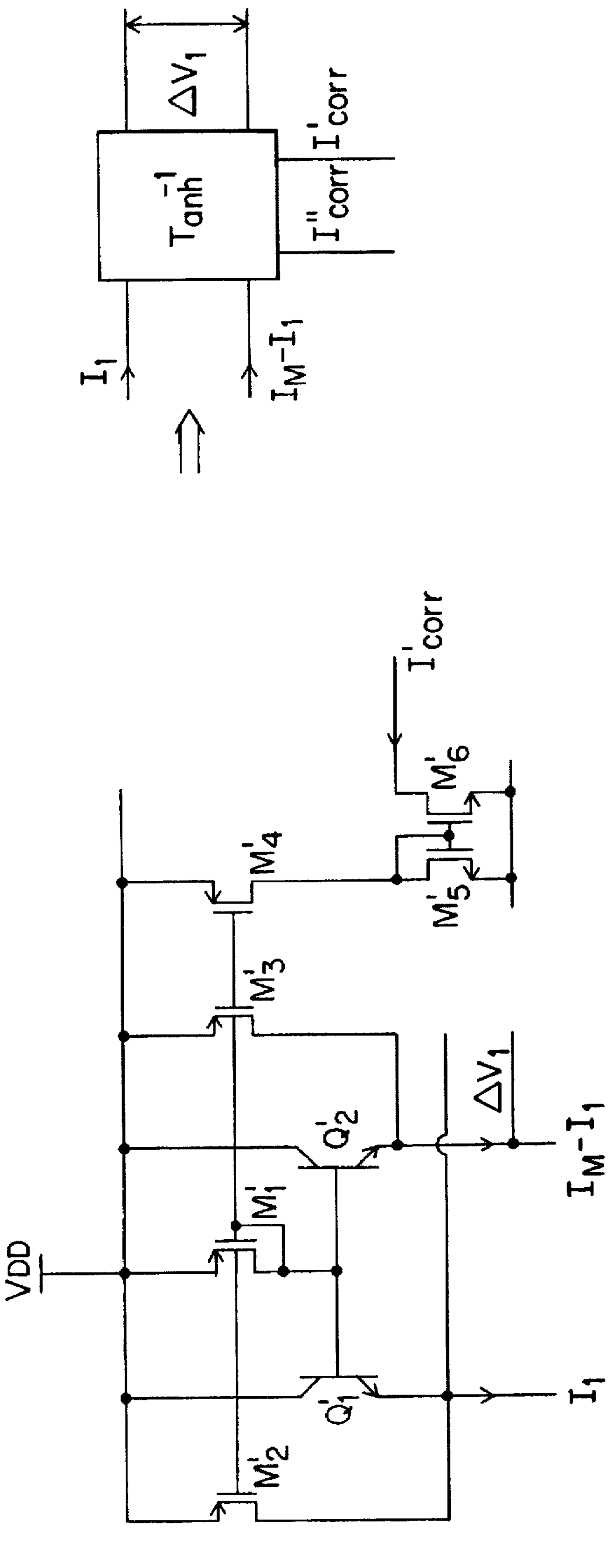
FIG. 7 shows a circuit diagram of each predistortion block of FIG. 6 that incorporates error compensating means according to the present invention.

The respective predistortion stages of the differential pairs of input current signals, I1 and IM–I1 and I2, IM–I2, respectively, are schematically depicted by the two blocks labeled $Tanh^{-1}$. Compensation for the base currents of the bipolar transistors of the differential stages of the four-quadrant multiplying cell, according to a substantially non-dissipative compensation scheme (i.e. according to the embodiment described in relation to the circuit of FIG. 4) is implemented also in this case by injecting correction currents $I_{corr}$, $I'_{corr}$ and $I''_{corr}$, respectively, on the common emitter nodes of the three differential stages of the four-quadrant multiplying cell, as depicted. The circuit of each predistortion block $Tanh^{-1}$ incorporating the compensation circuit of the invention for generating the relative correction current $I'_{corr}$ and $I''_{corr}$ is depicted in FIG. 7.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An analog multiplier comprising:

a differential stage having a pair of emitter-coupled bipolar transistors, the emitter-coupled bipolar transistors having a common emitter node to receive a first input current signal;

a predistortion stage having a first portion and a second portion;

the first portion of the predistortion stage having an output node coupled to a base of a first of the pair of emitter-coupled bipolar transistors, the first portion of the predistortion stage having a reciprocal of a hyperbolic tangent transfer function and having a second input current signal forced through it;

the second portion of the predistortion stage having an output node coupled to a base of a second of the pair of emitter-coupled bipolar transistors, the second portion of the predistortion stage having a reciprocal of a hyperbolic tangent transfer function and having a difference signal forced through it, the difference signal being a difference between a preset maximum input current and the second input current signal; and means, coupled to the pair of emitter-coupled bipolar transistors, for generating compensation currents that compensate for base currents of the first and second emitter-coupled bipolar transistors; wherein the means for generating compensation currents includes a first generator circuit coupled to the base of the first emitter-coupled bipolar transistor to generate a first compensation current, the first generator circuit having a first generating transistor that is substantially identical to each of the pair of emitter-coupled bipolar transistors and through which a current equal to a difference between the preset maximum input current and the first input current is forced, the first generating transistor having a base current that is mirrored on the output node of the first portion of the predistortion stage;

a second generator circuit coupled to the base of the second emitter-coupled bipolar transistor to generate a second compensation current, the second generator circuit having a second generating transistor that is substantially identical to each of the pair of emitter-coupled bipolar transistors and through which a current identical to the first input current signal is forced, the second generating transistor having a base current that is mirrored on the output node of the second portion of the predistortion stage;

a first compensating transistor that is substantially identical to each of the pair of emitter-coupled bipolar transistors and through which a current equal to the difference between the preset maximum input current and the first input current is forced, the first compensating transistor having a base that is connected to a collector of the first emitter-coupled bipolar transistor; and a second compensating transistor that is substantially identical to each of the pair of emitter-coupled bipolar transistors and through which a current equal to the first input current is forced, the second compensating transistor having a base that is connected to a collector of the second emitter-coupled bipolar transistor.

2. An analog multiplier comprising:

a differential stage having a pair of emitter-coupled bipolar transistors, the emitter-coupled bipolar transistors having a common emitter node to receive a first input current signal;

a predistortion stage having a first portion and a second portion;

the first portion of the predistortion stage having an output node coupled to a base of a first of the pair of emitter-coupled bipolar transistors, the first portion of the predistortion stage having a reciprocal of a hyperbolic tangent transfer function and having a second input current signal forced through it;

the second portion of the predistortion stage having an output node coupled to a base of a second of the pair of emitter-coupled bipolar transistors, the second portion of the predistortion stage having a reciprocal of a hyperbolic tangent transfer function and having a difference signal forced through it, the difference signal being a difference between a preset maximum input current and the second input current signal; and means, coupled to the pair of emitter-coupled bipolar transistors, for generating compensation currents that compensate for base currents of the first and second emitter-coupled bipolar transistors; wherein the means for generating compensation currents includes a first generator circuit coupled to the base of the first emitter-coupled bipolar transistor to generate a first compensation current, the first generator circuit having a first generating transistor that is substantially identical to each of the pair of emitter-coupled bipolar transistors and through which a current equal to a difference between the preset maximum input current and the first input current is forced, the first generating transistor having a base current that is mirrored on the output node of the first portion of the predistortion stage; and a second generator circuit coupled to the base of the second emitter-coupled bipolar transistor to generate a second compensation current, the second generator circuit having a second generating transistor that is substantially identical to each of the pair of emitter-coupled bipolar transistors and through which a current identical to the first input current signal is forced, the second generating transistor having a base current that is mirrored on the output node of the second portion of the predistortion stage.

3. The analog multiplier of claim 2, wherein the analog multiplier is included in a four quadrant analog multiplier having second and third pairs of emitter-coupled bipolar transistors arranged in a Gilbert cell configuration.

4. The analog multiplier of claim 2, wherein the analog multiplier is configured for single ended output.

5. An analog multiplier comprising:

a differential stage having a pair of emitter-coupled bipolar transistors, the emitter-coupled bipolar transistors having a common emitter node to receive a first input current signal;

a predistortion stage having a first portion and a second portion;

the first portion of the predistortion stage having an output node coupled to a base of a first of the pair of emitter-coupled bipolar transistors, the first portion of the predistortion stage having a reciprocal of a hyperbolic tangent transfer function and having a second input current signal forced through it;

the second portion of the predistortion stage having an output node coupled to a base of a second of the pair of emitter-coupled bipolar transistors, the second portion of the predistortion stage having a reciprocal of a hyperbolic tangent transfer function and having a difference signal forced through it, the difference signal being a difference between a preset maximum input current and the second input current signal; and means, coupled to the pair of emitter-coupled bipolar transistors, for generating compensation currents that compensate for base currents of the first and second emitter-coupled bipolar transistors; wherein the means for generating compensation currents includes a first generator, coupled to a common node that is common to the first and second portions of the predistortion stage, to provide a base current to the first and second portions of the predistortion stage;

first and second current mirrors, each coupled to the first generator and a respective one of the of the output nodes of the first and second portions of the predistortion stage, that respectively mirror a current proportional to a ratio between the preset maximum input current and a current gain of the pair of emitter-coupled bipolar transistors on each respective one of the output nodes of the first and second portions of the predistortion stage; and a third current mirror, coupled to the first generator and the common emitter node of the pair of emitter-coupled bipolar transistors, that mirrors a current proportional to the ratio between the preset maximum input current and a current gain of the pair of emitter-coupled bipolar transistors on the common emitter node of the pair of emitter-coupled bipolar transistors.

6. A method of reducing error in an output signal produced by an analog multiplier that has a differential output stage that includes a pair of emitter-coupled bipolar transistors, the pair of emitter-coupled bipolar transistors including a first and second bipolar transistor, the first and second bipolar transistors of the pair each being driven by a respective portion of a predistortion stage including a first portion of the predistortion stage and a second portion of the predistortion stage, each portion of the predistortion stage having an inverted hyperbolic tangent transfer function and an output node that is functionally connected to a base of the first and second bipolar transistors, respectively, the method comprising the steps of:

generating a first current replica of a base current of the first bipolar transistor;

mirroring the first current replica on the output node of the first portion of the predistortion stage;

generating a second current replica of a base current of the second bipolar transistor;

mirroring the second current replica on the output node of the second portion of the predistortion stage; and mirroring a current that is inversely proportional to a current gain of the pair of emitter-coupled bipolar transistors on a common emitter node of the pair of emitter-coupled bipolar transistors.

7. The method of claim 6, wherein the current that is mirrored on the common emitter node is equal to a preset maximum input current value divided by a current gain of the pair of emitter-coupled bipolar transistors.

8. A method of reducing error in an output signal produced by an analog multiplier that has a differential output stage that includes a pair of emitter-coupled bipolar transistors, the pair of emitter-coupled bipolar transistors including a first and second bipolar transistor, the first and second bipolar transistors of the pair each being driven by a respective portion of a predistortion stage including a first portion of the predistortion stage and a second portion of the predistortion stage, each portion of the predistortion stage having a reciprocal of a hyperbolic tangent transfer function and an output node that is functionally connected to a base of the first and second bipolar transistors, respectively, the method comprising the steps of:

mirroring a current that is inversely proportional to a current gain of the pair of emitter-coupled bipolar transistors on the output node of each respective portion of the predistortion stage and on a common emitter node of the pair of emitter-coupled bipolar transistors.

9. The method of claim 8, wherein the current that is mirrored on the output node of each respective portion of the predistortion stage and on the common emitter node is equal to a preset maximum input current value divided by a current gain of the pair of emitter-coupled bipolar transistors.

* * * * *

UNITED STATES PATENT AND TRADEMARK OFFICE

CERTIFICATE OF CORRECTION

PATENT NO. : 5,714,903

DATED : February 3, 1998

INVENTOR(S): Melchiorre Bruccoleri, Gaetano Cosentino, Marco Demicheli and Salvatore Portaluri It is certified that error appears in the above-identified patent and that said Letters Patent is hereby corrected as shown below:

On the title page:

[73] SGS-Thomson Microelectronics S.r.l., Agrate Brianza; Consorzio per la Ricerca sulla Microelettronica nel Mezzogiorno, Catania, both of Italy Signed and Sealed this Fifth Day of May, 1998

Attest:

BRUCE LEHMAN

*Attesting Officer*

*Commissioner of Patents and Trademarks*